US010691764B2

(12) United States Patent
Dechu et al.

(10) Patent No.: US 10,691,764 B2
(45) Date of Patent: Jun. 23, 2020

(54) SEARCH ENGINE OPTIMIZATION TECHNIQUES

(71) Applicant: International Business Machines Corporation, Armonk, NY (US)

(72) Inventors: Sampath Dechu, Bangalore (IN); Pratyush Kumar, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 15/790,393

(22) Filed: Oct. 23, 2017

(65) Prior Publication Data

US 2019/0121909 A1 Apr. 25, 2019

(51) Int. Cl.
*G06F 16/9535* (2019.01)
*G06F 16/958* (2019.01)
(Continued)

(52) U.S. Cl.
CPC ........ *G06F 16/9535* (2019.01); *G06F 16/986* (2019.01); *G06F 40/134* (2020.01);
(Continued)

(58) Field of Classification Search
CPC ............. G06F 16/9535; G06F 17/2235; G06F 17/279; G06F 16/986; G06F 17/2247; G06F 17/2785
(Continued)

(56) References Cited

U.S. PATENT DOCUMENTS 7,568,184 B1 * 7/2009 Roth .................. G06F 8/74
717/123
10,057,741 B2 * 8/2018 Molinet ............. G06F 9/44505
(Continued)

FOREIGN PATENT DOCUMENTS

CN 104573028 A 4/2015
CN 104809197 A 7/2015
(Continued)

OTHER PUBLICATIONS

Forbes, Chatbots and the Future of Conversation-Based Interfaces, https://www.forbes.com/sites/danielnewman/2016/05/24/chatbots-and-the-future-of-conversation-based-interfaces/#2b1f2a2f1fc7, May 24, 2016.

*Primary Examiner* — Phuong Thao Cao
(74) *Attorney, Agent, or Firm* — Ryan, Mason & Lewis, LLP (57) ABSTRACT

Methods, systems, and computer program products for search engine optimization techniques are provided herein. A computer-implemented method includes cataloging functionalities of one or more automated conversation exchange programs via a set of hypertext markup language pages, wherein the automated conversation exchange programs comprise computer programs capable of carrying out conversational exchanges with a user; semantically interlinking the set of hypertext markup language pages by adding, to each of the pages, hyperlinks to one or more of the other pages based on semantic similarity of page content; facilitating discoverability, via search engines, of the hypertext markup language pages based on the semantic interlinking; and redirecting a user search visit to one of the discoverable hypertext markup language pages, via one of the search engines, to one of the automated conversation exchange programs, wherein redirecting the user search visit to the automated conversation exchange program comprises providing the automated conversation exchange program with context information pertaining to the user search via deep conversational links.

25 Claims, 7 Drawing Sheets

(51) Int. Cl.
*G06F 40/30* (2020.01)
*G06F 40/134* (2020.01)
*G06F 40/14* (2020.01)
*G06F 40/35* (2020.01)

(52) U.S. Cl.
CPC .............. *G06F 40/14* (2020.01); *G06F 40/30* (2020.01); *G06F 40/35* (2020.01)

(58) Field of Classification Search
USPC ........................................................ 707/706
See application file for complete search history.

(56) References Cited

U.S. PATENT DOCUMENTS

| | | |
|---|---|---|
| 2006/0150119 A1 | 7/2006 | Chesnais et al. |
| 2008/0209336 A1* | 8/2008 | Brown .................. G06F 16/954 715/744 |
| 2009/0281966 A1 | 11/2009 | Biggs et al. |
| 2010/0125592 A1 | 5/2010 | Dauginas et al. |
| 2010/0332515 A1* | 12/2010 | Carraher ............. G06F 16/2471 707/769 |
| 2012/0041903 A1 | 2/2012 | Beilby et al. |
| 2012/0150973 A1* | 6/2012 | Barak .................... H04L 51/04 709/206 |
| 2013/0179420 A1 | 7/2013 | Park et al. |
| 2013/0275862 A1 | 10/2013 | Adra |
| 2014/0101186 A1* | 4/2014 | Lau .................... G06Q 30/0282 707/758 |
| 2015/0121290 A1* | 4/2015 | Li ........................ G06F 17/2785 715/780 |
| 2015/0186343 A1* | 7/2015 | McGill ................. G06F 3/0481 715/234 |
| 2016/0050165 A1* | 2/2016 | Thomas .............. G06F 3/04855 715/752 |
| 2016/0132612 A1* | 5/2016 | Warila ..................... G06F 8/24 715/234 |
| 2016/0299972 A1* | 10/2016 | Samdani ............. G06F 16/951 |
| 2017/0099368 A1* | 4/2017 | Hutter .................... H04L 67/34 |
| 2017/0180402 A1* | 6/2017 | Finnig .................. G06F 21/563 |
| 2017/0236196 A1* | 8/2017 | Isaacson ............ G06Q 30/0625 705/14.51 |
| 2017/0293834 A1* | 10/2017 | Raison .................... H04L 51/02 |
| 2018/0059887 A1* | 3/2018 | Jansen ................. G06F 3/0483 |
| 2018/0196796 A1* | 7/2018 | Wu ....................... G06N 20/10 |
| 2018/0277108 A1* | 9/2018 | Badr ..................... G06N 3/006 |
| 2018/0287968 A1* | 10/2018 | Koukoumidis ......... G06F 40/35 |
| 2018/0316630 A1* | 11/2018 | Jacobson ................ H04L 51/02 |

FOREIGN PATENT DOCUMENTS

| | | |
|---|---|---|
| CN | 106155522 A | 11/2016 |
| CN | 106484801 A | 3/2017 |

* cited by examiner

SEARCH ENGINE OPTIMIZATION TECHNIQUES

FIELD

The present application generally relates to information technology, and, more particularly, to search engine optimization.

BACKGROUND

Search engine optimization (SEO) techniques generally attempt to modify hypertext markup language (HTML) pages to improve the pages' PageRank or other equivalent scores. SEO techniques can face additional challenges and complexities within the context of chatbots (that is, computer programs—such as found, for example, in virtual assistants—capable of carrying out conversational exchanges via textual and/or auditory methods). Such challenges can be due, for instance, to heterogeneous chatbot platforms, a lack of available chatbot information, etc. Accordingly, as chatbots are increasingly released on a variety of platforms with a variety of skillsets, challenges pertaining to user visibility and discoverability similarly increase.

SUMMARY

In one embodiment of the present invention, techniques for search engine optimization techniques are provided. An exemplary computer-implemented method can include cataloging one or more functionalities of one or more automated conversation exchange programs via a set of hypertext markup language pages, wherein the automated conversation exchange programs comprise one or more computer programs capable of carrying out one or more conversational exchanges with a user. The method can also include semantically interlinking the set of hypertext markup language pages by adding, to each of the pages, one or more hyperlinks to one or more of the other pages based on semantic similarity of page content, and facilitating discoverability, via one or more search engines, of the set of hypertext markup language pages based on the semantic interlinking. Further, the method can also include redirecting a user search visit to one of the discoverable hypertext markup language pages, via one of the search engines, to one of the automated conversation exchange programs, wherein redirecting the user search visit to the automated conversation exchange program comprises providing the automated conversation exchange program with context information pertaining to the user search via one or more deep conversational links.

In another embodiment of the invention, an exemplary computer-implemented method can include generating a listing of functionalities for each of multiple automated conversation exchange programs, wherein generating the listing of functionalities comprises extracting questions of a user for which the automated conversation exchange program provided answers from historical user-automated conversation exchange program conversation logs, and wherein the automated conversation exchange programs comprise one or more computer programs capable of carrying out one or more conversational exchanges with a user. The method can also include generating an automated conversation exchange program skills directory for each of the multiple automated conversation exchange programs by cataloging each of the functionalities of the automated conversation exchange programs via a set of hypertext markup language pages, semantically interlinking the set of hypertext markup language pages by adding, to each of the pages, one or more hyperlinks to one or more of the other pages based on semantic similarity of page content, and storing the interlinked hypertext markup language pages in a database. Additionally, the method can include facilitating discoverability, via one or more search engines, of the set of hypertext markup language pages based on the semantic interlinking by permitting access to the database to one or more web crawlers of the search engines, and redirecting a user search visit to one of the discoverable hypertext markup language pages, via one of the search engines, to one of the automated conversation exchange programs, wherein redirecting the user search visit to the automated conversation exchange program comprises providing the automated conversation exchange program with context information pertaining to the user search via one or more deep conversational links.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes search engine optimization for chatbots (automated conversation exchange programs). While HTML indexing has transitioned to application (app) indexing, the increase of chatbots may lead to a focus on chatbot indexing.

At least one embodiment of the invention includes rendering chatbots discoverable by search engines and redirecting search queries to chatbots.

As further detailed herein, one or more embodiments of the invention include cataloging the functionality of a chatbot through a designed set of HTML pages referred to herein as the chatbot skills directory (CSD). Using the CSD, such an embodiment can additionally include subsequently discovering the chatbot via search engine crawlers. Also, the CSD HTMLs can enable improving the task of ranking a chatbot during a search in search engines.

Enabling and/or facilitating discovery of the features of the chatbot can include allowing standard web crawlers to index the CSD. Additionally, as further described herein, improving the search ranking of a chatbot can include interlinking the pages in the CSD by adding hyperlinks, based on semantic interlinking of conversations (SIC).

Further, at least one embodiment of the invention can include redirecting user visits to the pages of the CSD to a chatbot with deep conversational links (DCLs), which provide continuation of the conversation by deriving the context based on the user's search phrases.

Figure 1:
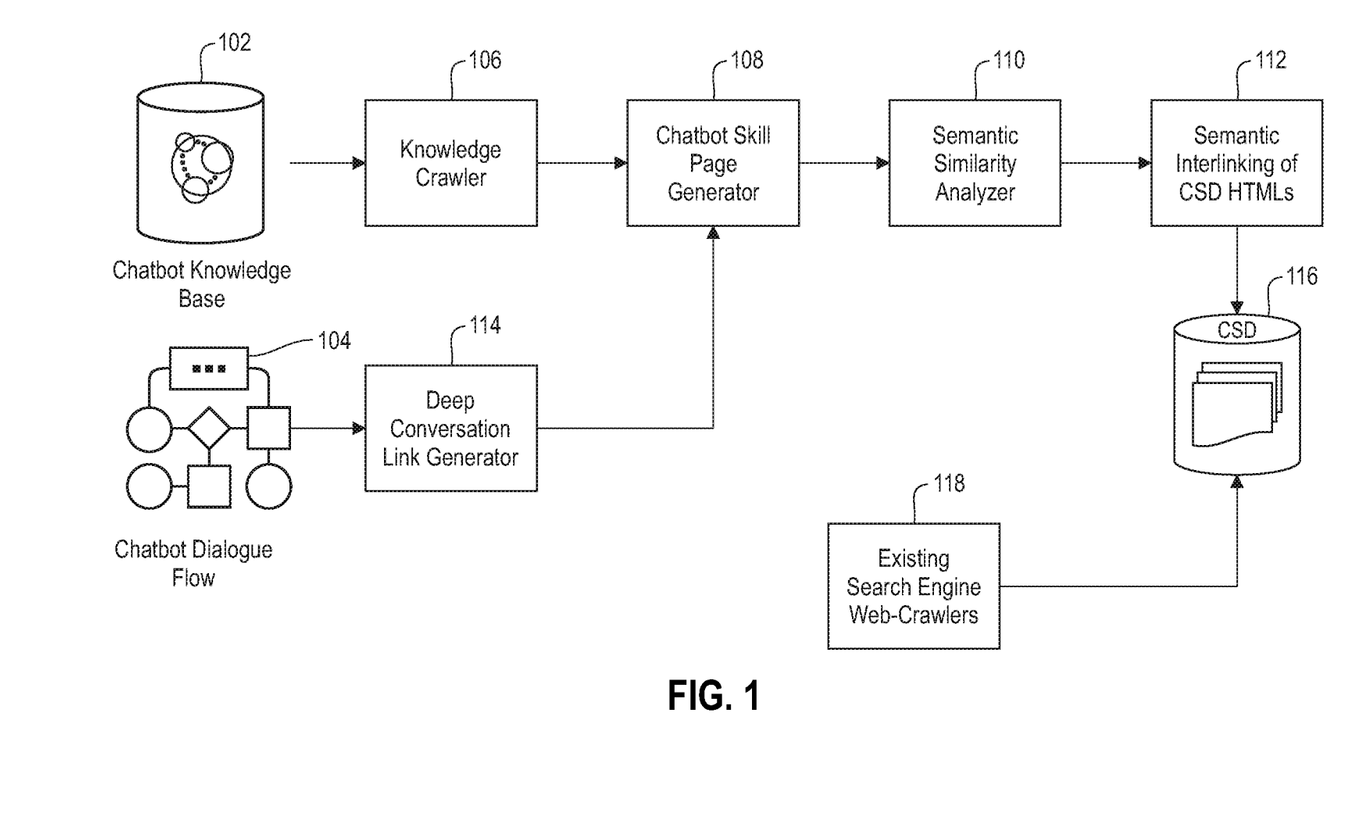
FIG. 1 is a diagram illustrating system architecture, according to an exemplary embodiment of the invention.

FIG. 1 is a diagram illustrating system architecture, according to an embodiment of the invention. By way of illustration, FIG. 1 depicts CSD curation. As depicted, a chatbot knowledge base 102 provides input to a knowledge crawler 106, while a chatbot dialogue flow 104 (which includes the conversations that the user(s) have had with the chatbot) provides input to a deep conversation link generator 114. The knowledge crawler 106 traverses the knowledge base 102 of the chatbot, which can include, for example, a knowledge graph or curated questions and answers. In one or more embodiments of the invention, the knowledge crawler 106 is customized for each type of knowledge base pertaining to a particular chatbot.

With respect to deep conversation links, when a search user interface (UI) directs a user to a page in the CSD, one or more embodiments of the invention include providing the chatbot with relevant context information which includes a current conversational node in the dialogue flow, and a summary of the conversation so far. Accordingly, a deep conversation link identifies the context information to send to the chatbot.

When the search UI directs the user to a CSD page, there are multiple options to deep link to the conversation. For example, a collaborative search engine can identify the relevant context information based on user profiling and in a format shared by the chatbot. With such an option, the collaborative search engine first receives a deep link application programming interface (API) from the chatbot, and then uses the deep link API to redirect users.

In another option, all work is carried out by the chatbot, and the search engine only directs to the page of the CSD. The chatbot translates, for each page of the CSD, the deep conversation link and redirects the user after the user lands on the CSD. In one or more embodiments of the invention, the chatbot takes the CSD page, finds deep conversation links in its knowledge base, and redirects the user to a specific conversation point.

Referring again to FIG. 1, the knowledge crawler 106 and deep conversation link generator 114 provide inputs to a chatbot skill page generator 108, which generates and outputs a chatbot skill page to a semantic similarity analyzer 110, and is further detailed in connection with FIG. 3. The chatbot skill page is utilized by the semantic similarity analyzer 110 to carry out semantic interlinking of CSD HTMLs via component 112.

It is to be appreciated that a component of many SEO techniques includes the interlinking of pages for higher ranks on metrics such as page rank. One or more embodiments of the invention can include interlinking the pages of the CSD by adding one or more hyperlinks to other pages based on semantic similarity. By way merely of illustration and no limitation, one example of a CSD is a frequently asked questions (FAQ) page without answers. In such an example, one or more embodiments of the invention include generating such pages from chatbot knowledge bases or previous conversations that users have had with the chatbot. At least one embodiment of the invention additionally includes "linking" to these pages so that it looks like a typical website for search engines to crawl, and when a user clicks any of these links, the chatbot will open a UI and go to a point of providing an answer to the question which was "clicked."

In at least one embodiment of the invention, interlinking such as noted above can include using the semantic similarity of the texts in the question, and can also include using the chat logs of users to identify relevant follow-up or preceding questions.

As additionally depicted in FIG. 1, CSDs, linked via component 112, can be provided to a CSD database 116, which can be accessed by search engine web crawlers 118, as detailed herein.

Figure 2:
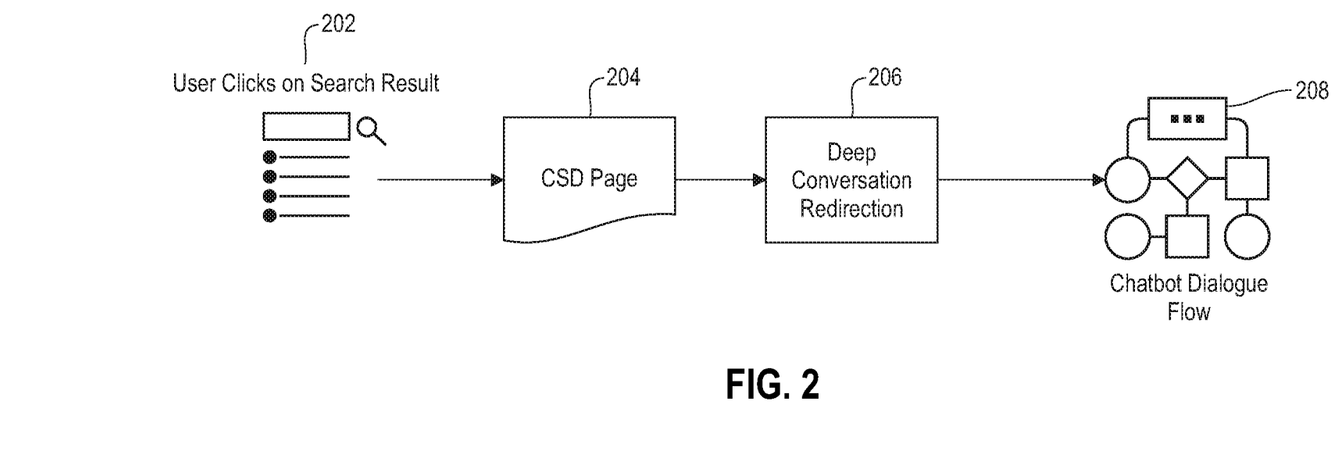
FIG. 2 is a diagram illustrating system architecture, according to an exemplary embodiment of the invention.

FIG. 2 is a diagram illustrating system architecture, according to an embodiment of the invention. By way of illustration, FIG. 2 depicts search result redirection, wherein a user clicks on a search result 202, which forwards the user to a CSD page 204 and a deep conversation redirection 206. From the deep conversation redirection, the user search result action is forwarded to a chatbot dialogue flow 208.

Figure 3:
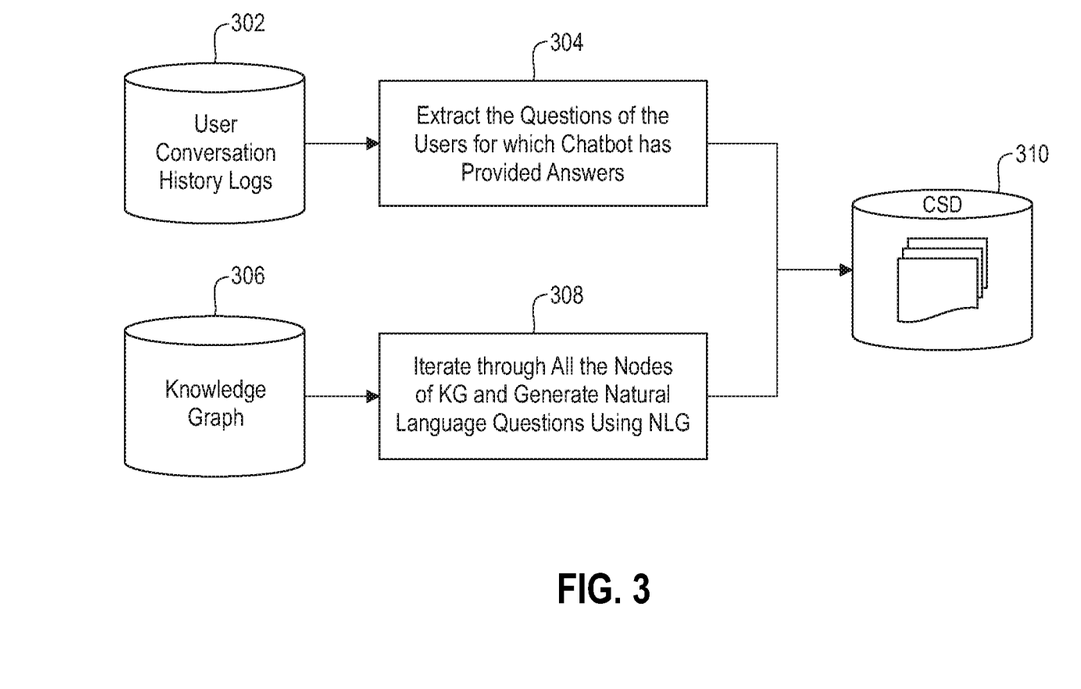
FIG. 3 is a diagram illustrating system architecture, according to an exemplary embodiment of the invention.

FIG. 3 is a diagram illustrating system architecture, according to an embodiment of the invention. By way of illustration, FIG. 3 depicts CSD generation. As depicted, a database 302 containing historical user conversation logs is utilized, via component 304, to extract the questions of the user for which a chatbot has provided answers. Additionally, a knowledge graph database 306 can be utilized via component 308 to iterate through all of the nodes of the knowledge graph (KG) and generate natural language questions using natural language generation (NLG) techniques. The extracted questions and the generated natural language questions are then provided to a CSD database 310, such as described above in connection with FIG. 1. By way merely of example, one format of a CSD can be similar to FAQ pages of a company about services provided, but without the answers (as only the questions are relevant for CSD purposes).

Figure 4:
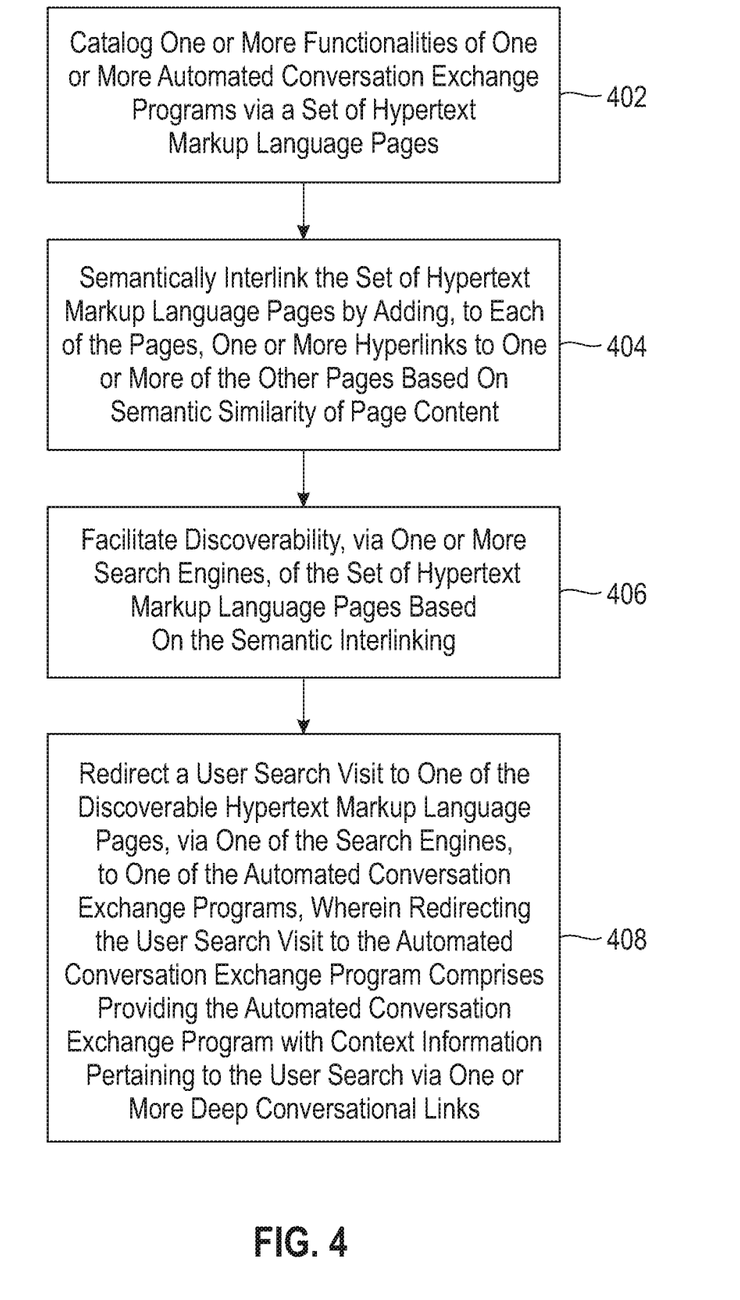
FIG. 4 is a flow diagram illustrating techniques according to an embodiment of the invention.

FIG. 4 is a flow diagram illustrating techniques according to an embodiment of the present invention. Step 402 includes cataloging one or more functionalities of one or more chatbots via a set of hypertext markup language pages, wherein the chatbots comprise one or more computer programs capable of carrying out one or more conversational exchanges with a user. The chatbots can include one or more computer programs capable of carrying out one or more text-based conversational exchanges and/or one or more auditory conversational exchanges with a user.

Step 404 includes semantically interlinking the set of hypertext markup language pages by adding, to each of the pages, one or more hyperlinks to one or more of the other pages based on semantic similarity of page content. Semantically interlinking the set of hypertext markup language pages can include using the semantic similarity of text in questions contained within each of the hypertext markup language pages. Additionally, semantically interlinking the set of hypertext markup language pages can include identifying one or more relevant follow-up questions and/or preceding questions based on one or more chat logs of users of the one or more chatbots.

Step 406 includes facilitating discoverability, via one or more search engines, of the set of hypertext markup language pages based on the semantic interlinking. Facilitating discoverability of the set of hypertext markup language pages can include improving a discoverability ranking and/or a search ranking of one or more of the hypertext markup language pages in the search engines. Additionally, facilitating discoverability of the set of hypertext markup language pages can include enabling indexing of the set of hypertext markup language pages by one or more web crawlers of the search engines.

Step 408 includes redirecting a user search visit to one of the discoverable hypertext markup language pages, via one of the search engines, to one of the chatbots, wherein redirecting the user search visit to the chatbot comprises providing the chatbot with context information pertaining to the user search via one or more deep conversational links. The one or more deep conversation links derive the context information based on the user's search phrases, and the context information can include a current conversational node in a dialogue flow corresponding to the user search and/or a summary of a conversation contained within the user search.

Also, redirecting the user search visit to the chatbot can include translating, for each of the discoverable hypertext markup language pages, a deep conversation link.

Also, an additional embodiment of the invention includes generating a listing of functionalities for each of multiple chatbots, wherein generating the listing of functionalities comprises extracting questions of a user for which the chatbot provided answers from historical user-chatbot conversation logs, and wherein the chatbots comprise one or more computer programs capable of carrying out one or more conversational exchanges with a user. Such an embodiment can also include generating a chatbot skills directory for each of the multiple chatbots by cataloging each of the functionalities of the chatbots via a set of hypertext markup language pages, semantically interlinking the set of hypertext markup language pages by adding, to each of the pages, one or more hyperlinks to one or more of the other pages based on semantic similarity of page content, and storing the interlinked hypertext markup language pages in a database. Additionally, such an embodiment can include facilitating discoverability, via one or more search engines, of the set of hypertext markup language pages based on the semantic interlinking by permitting access to the database to one or more web crawlers of the search engines, and redirecting a user search visit to one of the discoverable hypertext markup language pages, via one of the search engines, to one of the chatbots, wherein redirecting the user search visit to the chatbot comprises providing the chatbot with context information pertaining to the user search via one or more deep conversational links.

At least one embodiment of the invention (such as the techniques depicted in FIG. 4, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives chatbot functionality information derived from a data source to the transmission server. The server can process the information, for example, based upon user-provided user preference information that is stored in memory on the server. Subsequently, an alert is generated containing search redirection information. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
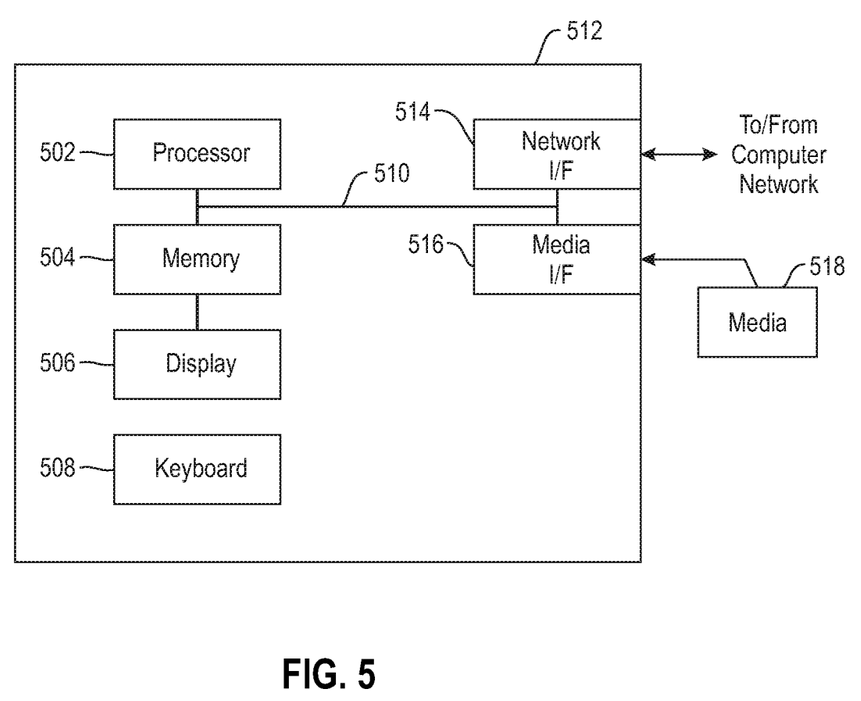
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
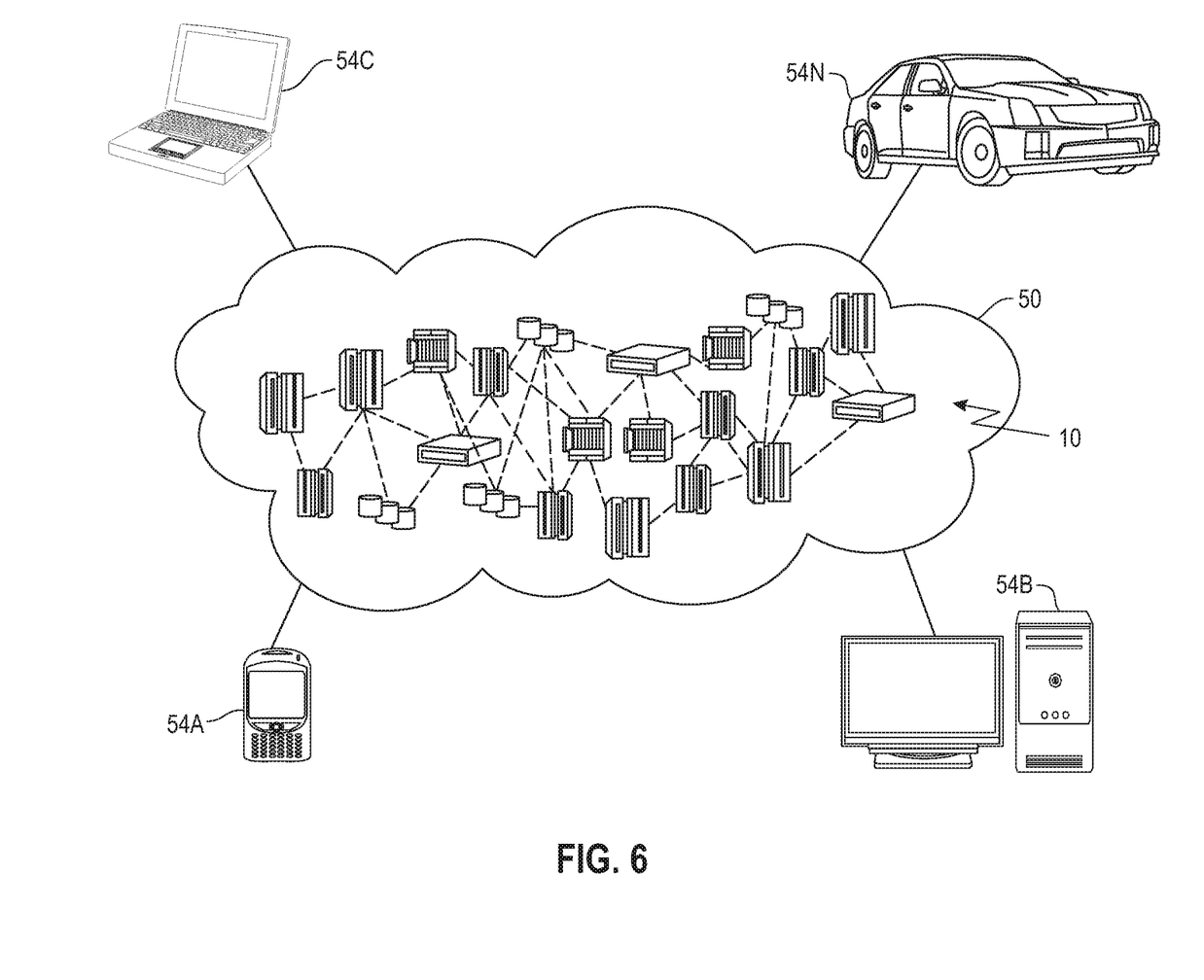
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
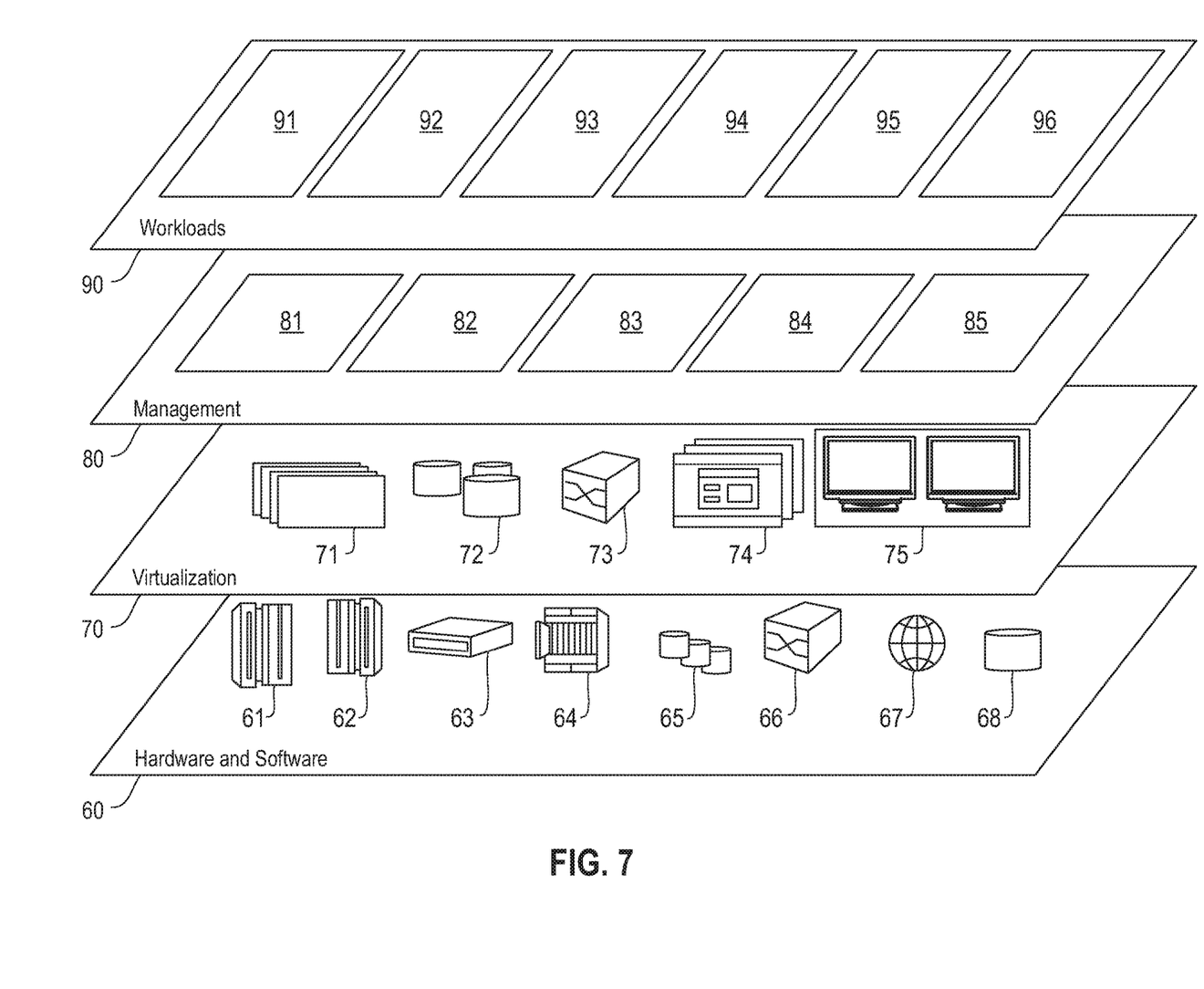
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and chatbot SEO 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide beneficial effects such as, for example, rendering chatbots discoverable via search engines and redirecting search queries to chatbots.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
cataloging one or more functionalities of one or more automated conversation exchange programs via a set of hypertext markup language pages, wherein the automated conversation exchange programs comprise one or more computer programs capable of carrying out one or more conversational exchanges with a user;
semantically interlinking the set of hypertext markup language pages by adding, to each of the hypertext markup language pages, one or more hyperlinks to one or more of the other hypertext markup language pages based on semantic similarity of hypertext markup language page content;
facilitating discoverability, via one or more search engines, of the set of hypertext markup language pages based on the semantic interlinking; and
redirecting a user search visit to one of the discoverable hypertext markup language pages, via one of the one or more search engines, to one of the automated conversation exchange programs, wherein redirecting the user search visit to the automated conversation exchange program comprises providing the automated conversation exchange program with context information pertaining to the user search visit via one or more deep conversational links;
wherein the method is carried out by at least one computing device.

2. The computer-implemented method of claim 1, wherein semantically interlinking the set of hypertext markup language pages comprises using the semantic similarity of text in questions contained within each of the hypertext markup language pages.

3. The computer-implemented method of claim 1, wherein semantically interlinking the set of hypertext markup language pages comprises identifying one or more relevant follow-up questions based on one or more chat logs of users of the one or more automated conversation exchange programs.

4. The computer-implemented method of claim 1, wherein semantically interlinking the set of hypertext markup language pages comprises identifying one or more relevant preceding questions based on one or more chat logs of users of the one or more automated conversation exchange programs.

5. The computer-implemented method of claim 1, wherein facilitating discoverability of the set of hypertext markup language pages comprises improving a discoverability ranking of one or more of the hypertext markup language pages in the one or more search engines.

6. The computer-implemented method of claim 1, wherein facilitating discoverability of the set of hypertext markup language pages comprises improving a search ranking of one or more of the hypertext markup language pages in the one or more search engines.

7. The computer-implemented method of claim 1, wherein facilitating discoverability of the set of hypertext markup language pages comprises enabling indexing of the set of hypertext markup language pages by one or more web crawlers of the one or more search engines.

8. The computer-implemented method of claim 1, wherein the one or more deep conversational links derive the context information based on the user's search phrases.

9. The computer-implemented method of claim 1, wherein the context information comprises a current conversational node in a dialogue flow corresponding to the user search visit.

10. The computer-implemented method of claim 1, wherein the context information comprises a summary of a conversation contained within the user search visit.

11. The computer-implemented method of claim 1, wherein redirecting the user search visit to the automated conversation exchange program comprises translating, for each of the discoverable hypertext markup language pages, a deep conversational link.

12. The computer-implemented method of claim 1, wherein the automated conversation exchange programs comprise one or more computer programs capable of carrying out one or more text-based conversational exchanges with a user.

13. The computer-implemented method of claim 1, wherein the automated conversation exchange programs comprise one or more computer programs capable of carrying out one or more auditory conversational exchanges with a user.

14. A computer program product comprising a non-transitory computer readable storage medium having program instructions embodied therewith, the program instructions executable by a computing device to cause the computing device to:
catalog one or more functionalities of one or more automated conversation exchange programs via a set of hypertext markup language pages, wherein the automated conversation exchange programs comprise one or more computer programs capable of carrying out one or more conversational exchanges with a user;
semantically interlink the set of hypertext markup language pages by adding, to each of the hypertext markup language pages, one or more hyperlinks to one or more of the other hypertext markup language pages based on semantic similarity of hypertext markup language page content;
facilitate discoverability, via one or more search engines, of the set of hypertext markup language pages based on the semantic interlinking; and
redirect a user search visit to one of the discoverable hypertext markup language pages, via one of the one or more search engines, to one of the automated conversation exchange programs, wherein redirecting the user search visit to the automated conversation exchange program comprises providing the automated conversation exchange program with context information pertaining to the user search visit via one or more deep conversational links.

15. The computer program product of claim 14, wherein semantically interlinking the set of hypertext markup language pages comprises using the semantic similarity of text in questions contained within each of the hypertext markup language pages.

16. The computer program product of claim 14, wherein the one or more deep conversational links derive the context information based on the user's search phrases.

17. The computer program product of claim 14, wherein the context information comprises a current conversational node in a dialogue flow corresponding to the user search visit.

18. The computer program product of claim 14, wherein the context information comprises a summary of a conversation contained within the user search visit.

19. The computer program product of claim 14, wherein redirecting the user search visit to the automated conversation exchange program comprises translating, for each of the discoverable hypertext markup language pages, a deep conversational link.

20. A system comprising:
a memory; and
at least one processor operably coupled to the memory and configured for:
cataloging one or more functionalities of one or more automated conversation exchange programs via a set of hypertext markup language pages, wherein the automated conversation exchange programs comprise one or more computer programs capable of carrying out one or more conversational exchanges with a user;
semantically interlinking the set of hypertext markup language pages by adding, to each of the hypertext markup language pages, one or more hyperlinks to one or more of the other hypertext markup language pages based on semantic similarity of hypertext markup language page content;
facilitating discoverability, via one or more search engines, of the set of hypertext markup language pages based on the semantic interlinking; and
redirecting a user search visit to one of the discoverable hypertext markup language pages, via one of the one or more search engines, to one of the automated conversation exchange programs, wherein redirecting the user search visit to the automated conversation exchange program comprises providing the automated conversation exchange program with context information pertaining to the user search visit via one or more deep conversational links.

21. A computer-implemented method comprising:
generating a listing of functionalities for each of multiple automated conversation exchange programs, wherein generating the listing of functionalities comprises extracting questions of a user for which the automated conversation exchange program provided answers from historical user-automated conversation exchange program conversation logs, and wherein the multiple automated conversation exchange programs comprise one or more computer programs capable of carrying out one or more conversational exchanges with a user;
generating an automated conversation exchange program skills directory for each of the multiple automated conversation exchange programs by cataloging each of the functionalities of the multiple automated conversation exchange programs via a set of hypertext markup language pages;
semantically interlinking the set of hypertext markup language pages by adding, to each of the hypertext markup language pages, one or more hyperlinks to one or more of the other hypertext markup language pages based on semantic similarity of hypertext markup language page content;
storing the interlinked hypertext markup language pages in a database;
facilitating discoverability, via one or more search engines, of the set of hypertext markup language pages based on the semantic interlinking by permitting access to the database to one or more web crawlers of the one or more search engines; and
redirecting a user search visit to one of the discoverable hypertext markup language pages, via one of the one or more search engines, to one of the multiple automated conversation exchange programs, wherein redirecting the user search visit to the automated conversation exchange program comprises providing the automated conversation exchange program with context information pertaining to the user search visit via one or more deep conversational links;
wherein the method is carried out by at least one computing device.

22. The computer-implemented method of claim 21, wherein the one or more deep conversational links derive the context information based on the user's search phrases.

23. The computer-implemented method of claim 21, wherein the context information comprises a current conversational node in a dialogue flow corresponding to the user search visit.

24. The computer-implemented method of claim 21, wherein the context information comprises a summary of a conversation contained within the user search visit.

25. A computer program product comprising a non-transitory computer readable storage medium having program instructions embodied therewith, the program instructions executable by a computing device to cause the computing device to:
generate a listing of functionalities for each of multiple automated conversation exchange programs, wherein generating the listing of functionalities comprises extracting questions of a user for which the automated conversation exchange program provided answers from historical user-automated conversation exchange program conversation logs, and wherein the multiple automated conversation exchange programs comprise one or more computer programs capable of carrying out one or more conversational exchanges with a user;
generate an automated conversation exchange program skills directory for each of the multiple automated conversation exchange programs by cataloging each of the functionalities of the multiple automated conversation exchange programs via a set of hypertext markup language pages;
semantically interlink the set of hypertext markup language pages by adding, to each of the hypertext markup language pages, one or more hyperlinks to one or more of the other hypertext markup language pages based on semantic similarity of hypertext markup language page content;
store the interlinked hypertext markup language pages in a database;
facilitate discoverability, via one or more search engines, of the set of hypertext markup language pages based on the semantic interlinking by permitting access to the database to one or more web crawlers of the one or more search engines; and
redirect a user search visit to one of the discoverable hypertext markup language pages, via one of the one or more search engines, to one of the multiple automated conversation exchange programs, wherein redirecting the user search visit to the automated conversation exchange program comprises providing the automated conversation exchange program with context information pertaining to the user search visit via one or more deep conversational links.

* * * * *